US008788141B2

(12) United States Patent
Isaacs et al.

(10) Patent No.: US 8,788,141 B2
(45) Date of Patent: Jul. 22, 2014

(54) SYSTEMS AND METHODS FOR REMOTE MONITORING OF VEHICLE INSPECTIONS

(75) Inventors: Mark R. Isaacs, Elk Grove, CA (US); Daniel A. Fleming, Orangevale, CA (US); William D. Culp, Sacramento, CA (US); Gary S. Lang, Sacramento, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1436 days.

(21) Appl. No.: 11/567,085

(22) Filed: Dec. 5, 2006

(65) Prior Publication Data
US 2008/0133080 A1 Jun. 5, 2008

(51) Int. Cl.
*G01M 15/04* (2006.01)
(52) U.S. Cl.
USPC .......................... 701/33.5; 701/29.1; 701/31.4
(58) Field of Classification Search
CPC ................ G01M 15/04; G01M 15/05; G01M 15/10–15/104; G01M 15/11; G07C 5/00; G07C 5/008; G07C 5/006; F02B 77/08; F02B 77/083–77/086
USPC ........ 701/29, 32, 33, 35, 109, 114, 123, 29.1, 701/31.4, 31.5, 31.7, 32.1, 32.8, 33.2, 33.5, 701/33.6; 705/305
See application file for complete search history.

(56) References Cited

U.S. PATENT DOCUMENTS

2004/0015278 A1* 1/2004 Gordon et al. ................. 701/33
2005/0038580 A1* 2/2005 Seim et al. .................... 701/29

OTHER PUBLICATIONS

New York State Program Evaluation Report, Enhanced Inspection/Maintenance (I/M) Programs: NYTEST and NYVIP, Period of Jun. 30, 2004-Jun. 30, 2006, Published: Feb. 2007, New York State Department of Environmental Conservation, http://www.dec.ny.gov/docs/air_pdf/Enhanced_IM_Program_2004-2006_final.pdf.*
Evaluation of Test Data Collected in 2004 and 2005 from Connecticut's Inspection/Maintenance Program, Oct. 2006, dKC—de la Torre Klasmeier Consulting, http://www.ct.gov/dep/lib/dep/air/vehicle_emissions/imreport2004&2005.pdf.*
Hodge et al, A Survey of Outlier Detection Methodologies, Jan. 2004, University of New York, Department of Computer Science, http://www.geo.upm.es/postgrado/CarlosLopez/papers/Hodge+Austin_OutlierDetection_AIRE381.pdf.*

* cited by examiner

*Primary Examiner* — Khoi Tran
*Assistant Examiner* — Spencer Patton

(57) ABSTRACT

Systems and methods for remote monitoring of vehicle inspections are provided. Using a wireless, network-enabled device, an inspection monitor may access a centralized vehicle inspection database, such as a motor vehicle administration and/or transportation department computer system tied into all the vehicle inspection stations in a jurisdiction. The inspection monitor may access the real time inspection records for a particular station and analyze the data for suspicion of fraudulent inspection practices.

16 Claims, 8 Drawing Sheets

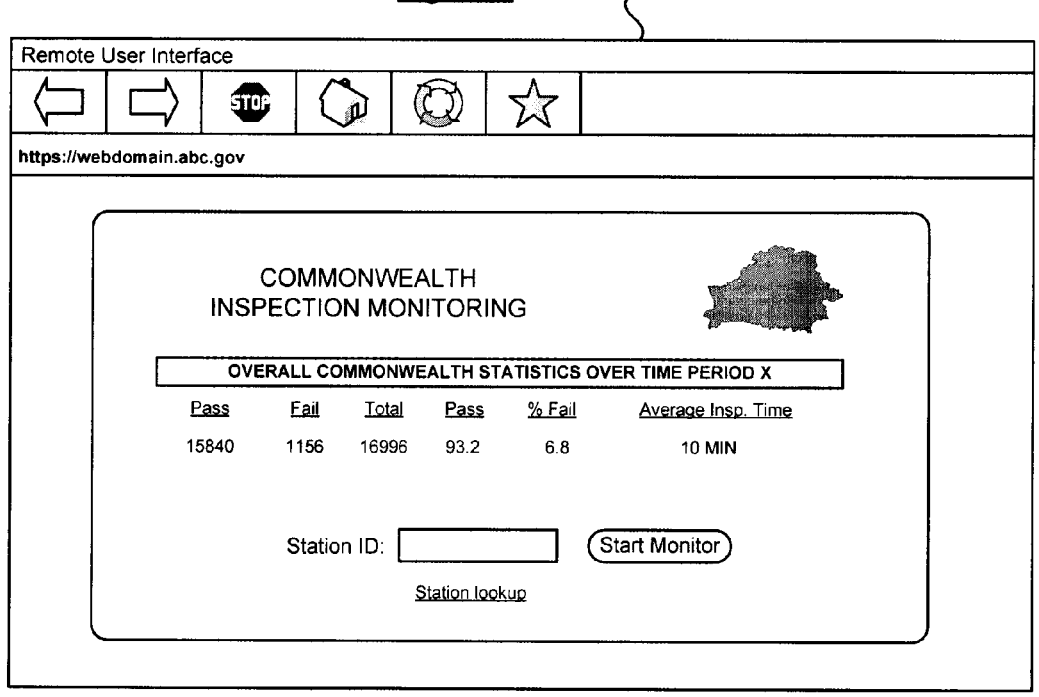

Figure 7

| OVERALL COMMONWEALTH STATISTICS OVER TIME PERIOD X | | | | | |
|---|---|---|---|---|---|
| Pass | Fail | Total | Pass | % Fail | Average Insp. Time |
| 15840 | 1156 | 16996 | 93.2 | 6.8 | 10 Min |

Station ID: 123456  (Stop Monitor)

EXPRESS AUTO SHOP Past Week Statistics

| Tech ID | Name | Pass | Fail | Total | % Pass | % Fail | Average Insp. Time |
|---|---|---|---|---|---|---|---|
| 101 | John Doe | 120 | 2 | 122 | 98.4 | 1.6 | 7.8 Min |
| 102 | Jim Doe | 75 | 4 | 79 | 94.9 | 5.1 | 8.2 Min |
| 103 | Jack Doe | 69 | 3 | 72 | 95.8 | 4.2 | 11.0 Min |

[ Monitoring in Progress Inspections ]

| Time | Status | Tech ID | Year | Make | Plate | Insp. Time | Result |
|---|---|---|---|---|---|---|---|
| 01:45 PM | Completed | 101 | 2002 | GMC | ABC123 | 2 | P |
| 01:50 PM | Completed | 102 | 2001 | FORD | DEF456 | 5 | P |
| 02:00 PM | In Progress | 103 | 1999 | TOYO | GHI789 | | |

Figure 8

Inspection Record Details

Requested 2:30 PM – 5/5/2006  Monitor ID: C355
1999 TOYO, Plate: GH1789  Inspection ID: 235533-06

General Information

Database Record ID: 34559  Inspection ID: 235533-06

Software Version: 2.1  Test Start Date/Time: 1:31 5/5/2006

Emissions Cost: 15  Test End Date/Time: 1:37 5/5/2006

Inspector ID: 101  Inspector Name: John Doe

Results

Overall Result: P  Odometer Tamper: N

Emissions Result: P  Visible Smoke: N

Emissions Result: P

Vehicle Information

Model Year: 1999  VIN: J123539666999

Make: Toyota  License Plate: GH1789

Model: Camry  Vehicle Code: P

Mileage: 117532  Fuel Type: G

Emissions Information

Hydrocarbons: 25 PPM  Exhaust tampering: N

Carbon Monoxide: 3%

Nitric Oxide: 20 PPM ( RETURN TO MONITOR )

SYSTEMS AND METHODS FOR REMOTE MONITORING OF VEHICLE INSPECTIONS

BACKGROUND INFORMATION

Due to concerns over air pollution and global climate change as well as general highway safety, most jurisdictions in the United States now require regular vehicle inspections. In addition to checking vehicles for obvious items such as brakes, lights, mirrors, and tire tread, many jurisdictions also perform emission analysis of vehicle exhaust. In addition to checking for visible smoke, emission tests are now typically performed using automated sensing equipment that check for hydrocarbons, carbon monoxide, nitric oxide, and other possible emissions. This equipment in many cases is connected directly to a jurisdiction-owned computer system that allows the jurisdiction to obtain a complete inspection record including the vehicle identification information and relevant emissions data for that vehicle.

Automated inspection systems allow the state to maintain statistics on vehicles in the jurisdiction and in theory also reduce fraudulent inspection practices—that is, passing vehicles without actually confirming that they should be passed or in some cases ignoring detected violations.

Inspection criteria and fees are usually set by legislation and/or agency order. Therefore, inspection stations are limited as to what they can charge for performing inspections and are thus incentivized to perform them as quickly as possible to maximize total revenue. This may lead to sloppy and even fraudulent practices despite the use of automated systems.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 6 is another exemplary screen of a remote monitoring interface including a home screen in accordance with various embodiments of the disclosure;

FIG. 7 is yet another exemplary screen of a remote monitoring interface including an inspection facility detail in accordance with various embodiments of the disclosure; and FIG. 8 is still a further exemplary screen of a remote monitoring interface including a vehicle inspection record detail in accordance with various embodiments of the disclosure.

DETAILED DESCRIPTION

The following description is intended to convey a thorough understanding of the embodiments described by providing a number of specific embodiments and details involving remote monitoring of vehicle inspections. It should be appreciated, however, that the present disclosure is not limited to these specific embodiments and details, which are exemplary only. It is further understood that one possessing ordinary skill in the art, in light of known systems and methods, would appreciate the use of the inventions for its intended purposes and benefits in any number of alternate embodiments, depending upon specific design and other needs.

At least one embodiment of the disclosure may provide a user interface adapted to communicate with a remote data server via a communications medium, to obtain vehicle inspection information corresponding to a vehicle inspection facility and to output vehicle inspection information to an inspection monitor's remote interface device.

At least one embodiment according to the disclosure may provide a method of performing remote vehicle inspection monitoring. The method according to this embodiment may comprise connecting a user to a remote vehicle inspection database via a computing device coupled to a communication medium, accessing vehicle inspection information in the remote database, and outputting real time vehicle inspection information to the user via an interface on the computing device.

Another embodiment according to the disclosure may provide a system. The system according to this embodiment may comprise an interface module, adapted to receive user input and present user output, a communications module adapted to connect to a remote vehicle inspection information database and retrieve information from the database, and an analysis module adapted to analyze vehicle inspection information obtained from the remote database and to present an analysis summary to the user via the interface module.

Figure 1:
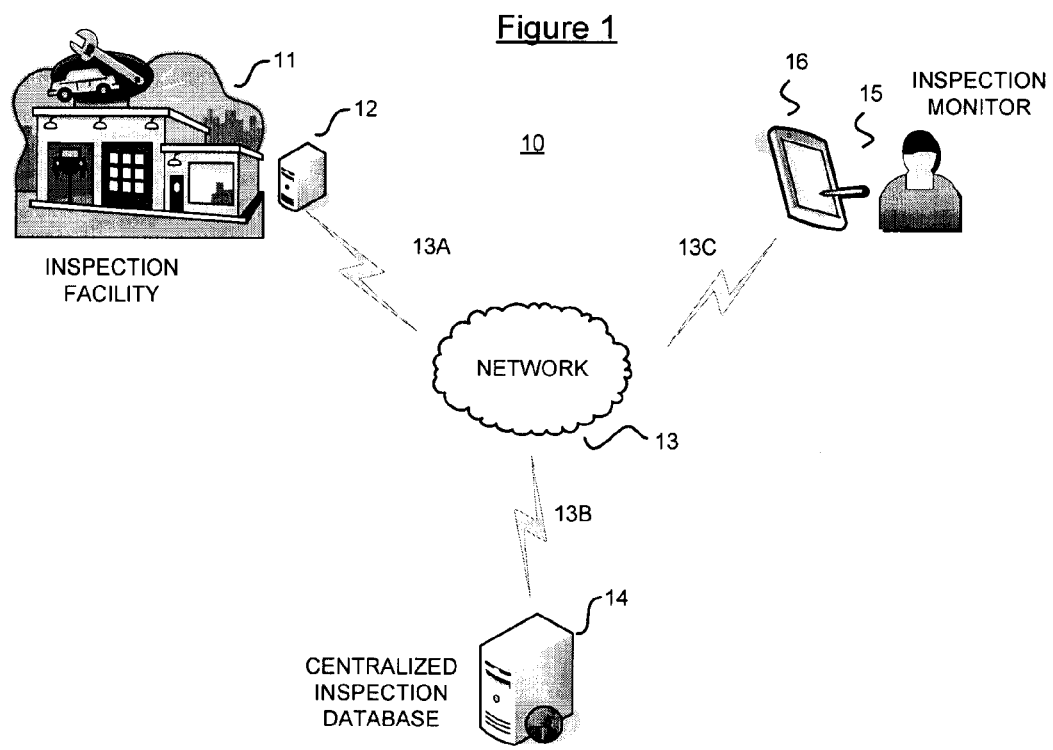
FIG. 1 is a schematic diagram of a vehicle inspection monitoring system for facilitating remote monitoring of vehicle inspections in accordance with an embodiment of the disclosure.

Referring now to FIG. 1, this Figure is a schematic diagram of a system for performing remote monitoring of vehicle inspections in accordance with an embodiment of the disclosure. The system may comprise one or more inspection facilities 11, each including at least one inspection facility computer system 12 in communication with a centralized inspection database 14 via communications network 13. In various embodiments the communication network 13 may comprise a wide area network such as the Internet, however, the communication network 13 may also be a conventional public switched telephone network (PSTN) or other suitable network. Also, another network 13A may be used by the inspection computer system 12 to connect to the network 13. This may comprise a wireless local area network (WLAN), DSL connection, peer network, or other suitable network, as is well known.

Similarly, the centralized inspection database 14 may be connected directly to the network 13. Also, an interface network, such as network 13B, may provide "the last mile" of the connection to the network 13. In various embodiments, the centralized inspection database 14 may be maintained by a governmental agency such as a department of motor vehicles (DMV), department of transportation (DOT) or other agency.

In the exemplary system of FIG. 1, an inspection monitor 15 may be located at any geographical location from which the network 13 may be accessed. The inspection monitor 15 may utilize an interface device 16 such a laptop computer, tablet computer, personal digital assistant (PDA), wireless phone, or other suitable interface device configured to display inspection information corresponding to one or more inspection facilities.

Various embodiments of the present disclosure permit the inspection monitor 15 to be located virtually anywhere that he/she is able to gain access to the remote inspection database 14, rather than within visual proximity to the inspection facility. In various embodiments, the inspection monitor 15 may utilize a computing and/or communication interface device 16 that is configured to access the network 13 via a local connection 12C. In one, this may be performed through a cellular network, wireless broadband network, wireless satellite network, or other suitable wireless network. In various embodiments, the remote inspection monitor 15 may access the centralized inspection database 14 via the interface device 16 in real time, to monitor the inspection practices of a particular inspection facility, such as facility 11 in FIG. 1. In another embodiment, the inspection monitor 15 may access the same system that the inspection facility 11 is supplying inspection data to, so that real time data input as well as historical data for that facility 11 may be accessed and analyzed by the inspection monitor 15.

The inspection monitor 15 may still desire to be located relatively close to a target inspection facility, such as inspection facility 11, in case, based on analysis of that facility's inspection data, it becomes necessary to intervene at the facility to issue citations, warnings or perform other investigative actions. However, the requirement of direct line of sight and data gathering solely through observation will be ideally eliminated. By accessing the centralized inspection database 14, or even directly accessing the inspection facility computer system 12, as will be discussed in greater detail in the context of FIGS. 2-8, the inspection monitor 15 can see trends in a facility's inspection data, compare the data to aggregate data from within the jurisdiction, and even perform fraud analysis manually and/or with the assistance of automated software. Furthermore, in various embodiments, the inspection monitor 15 may switch from monitoring one inspection facility to another without having to change physical locations. This may be particularly beneficial in metropolitan areas where the density of inspection facilities may be relatively high.

Figure 2:
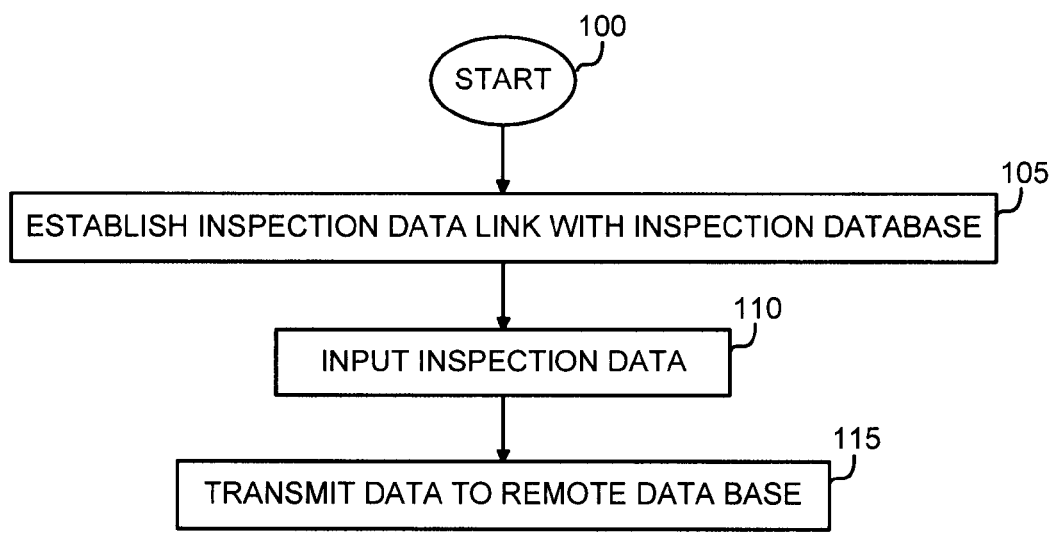
FIG. 2 is a flow chart of an exemplary method for monitoring vehicle inspection using conventional techniques.

Referring now to FIG. 2, this Figure is a flow chart of an exemplary method for monitoring vehicle inspections using conventional techniques. The method begins in step 100. In step 105, the vehicle inspection, that is the technician at the inspection facility that is performing the inspection, establishes a data link with a remote inspection database, such as the centralized database 14 of FIG. 1. This may occur when a new vehicle enters the inspection facility. Also, the vehicle inspector may enter his/her identification information to the inspection facility computer system 12 as well as information identifying the vehicle to be inspected. This information may comprise a license plate number, a vehicle make, a vehicle model, a vehicle identification number (VIN), a vehicle registration number and/or other identification information. This information may be uploaded upon entry to establish a real time data record with the centralized inspection database computer system, as is well known.

In step 110, after the data link has been established and the identification information has been entered, the inspection data (e.g., answers to the inspection questions) are input by the vehicle inspector. In some cases this data is input at the end of the inspection, while in other cases, some or all of the data may be input in real time, that is, as it is acquired. As is well known, this data may include pass—fail values for one or more questions/inspection points. In step 115 the data may be transmitted to the centralized inspection database 14. In some cases this data may be transmitted at the end of the inspection, while in other cases, some or all of the data may be transmitted as it is acquired. In some jurisdictions, emissions sensing equipment is coupled directly to a centralized inspection database, such as centralized inspection database 14, so that emissions results are transmitted directly as part of the emissions testing process. One purpose of this is to reduce fraud.

Figure 3:
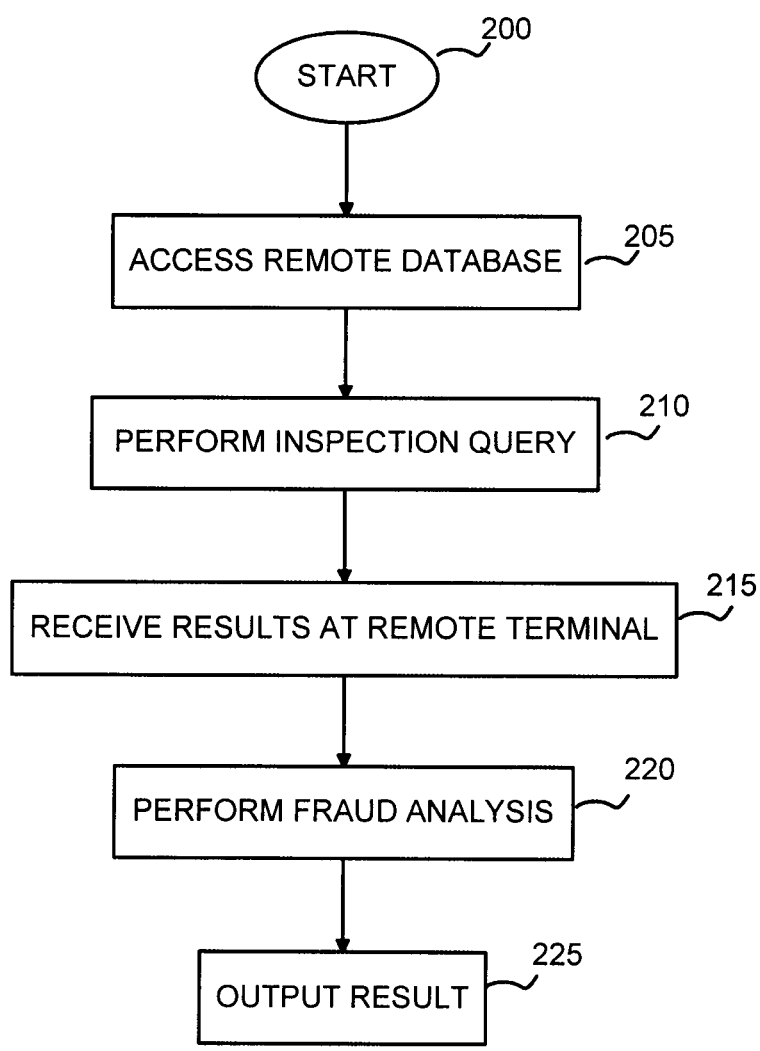
FIG. 3 is a flow chart of an exemplary method for remote monitoring of vehicle inspections in accordance with various embodiments of the disclosure.

Referring now to FIG. 3, this Figure is a flow chart of an exemplary method for performing remote monitoring of vehicle inspections in accordance with various embodiments of the disclosure. The method begins in block 200. In block 205, the centralized inspection database 14 is accessed. In various embodiments, this may comprise accessing the database 14 by an inspection monitor 15 with an access software program executing on the inspection monitor's interface device 16. In various embodiments, the interface device 16 may comprise a laptop computer, tablet computer, or other computing device and the centralized database 14 may be accessed through a web browser interface executing on the interface device 16.

In other embodiments a dedicated software client may be used to access the remote database. This may also comprise entering log-in credentials which may be validated either locally, that is at the inspection monitor's device 16, or remotely at the centralized inspection database 14 itself In block 210 the inspection monitor 15 may perform an inspection query. In various embodiments, this may comprise inputting a name, id number, address, or other identifying information for a particular inspection facility, such as inspection facility 11 in FIG. 1. In step 215, the query results may be received at the inspection monitor's interface device 16. In various embodiments, the results may be displayed on an interface screen of a the inspection monitor's interface device 16. As will be discussed in greater detail in the context of FIGS. 6-8, this may comprise displaying information corresponding to a particular inspection facility, aggregate information for a particular jurisdiction or sub-jurisdiction (county, city, region, etc), information about a particular inspection record, that is, for a single vehicle, etc. In various embodiments, the interface screen may be adapted to permit the inspection monitor 15 to "drill down" through the data from a high level to a low level.

In block 220, fraud analysis may be performed on the query results received at the inspection monitor's device 16. In various embodiments, this may comprise comparing the results for a particular vehicle inspection facility with aggregate results for the jurisdiction, sub-jurisdiction, city, etc., in which the vehicle inspection facility is situated, to see if the particular vehicle inspection facility's inspection data is inline, that is consistent with, data for the jurisdiction/sub-jurisdiction/city, etc. Fraudulent inspection practices may be inferred from deviations from aggregate numbers in one or more vehicle inspection fields. For example if the vehicle inspection time for a particular vehicle inspector or vehicle inspection facility is significantly less than the average time, and/or if the pass rate is more than a few points higher than the average pass rate, etc., fraud may be present. Also, if the values for a given vehicle differ from a known average for that type of vehicle by more than a predetermined percentage, fraud may be suspected.

In various embodiments, the inspection monitor 15 may analyze the data him/herself to look for evidence of potential fraudulent inspection practices. In various other embodiments, an interface program used to access the inspection data at the centralized inspection database may be adapted to analyze the inspection data automatically for evidence of fraud using one or more preprogrammed fraud analysis routines. In various embodiments, if fraud is suspected, in block 225 a particular piece of potentially incriminating data may be highlighted on an output screen of the interface device 16, or an alert or other indicator may be triggered on the device 16 to alert the inspection monitor 15 to the presence of suspected fraud.

It should be appreciated that although FIGS. 1-3 thus far describes systems and methods for performing remote monitoring of vehicle inspections whereby an inspection monitor 15 accesses a centralized inspection database 14 to obtain vehicle inspection data for a particular inspection facility, various embodiments, may operate differently. For example, in one embodiment, the inspection monitor 15 may access a vehicle inspection facility's inspection computer system 12 via the network 13 through a software interface provided by the inspection monitor's interface device 16, without connecting to the centralized inspection database 14. In another embodiment, the inspection monitor 15 may intercept communications between a inspection facility's vehicle inspection computer system 12 and the centralized inspection database 14. In yet another embodiment, the inspection facility's vehicle inspection computer system 12 may be required as part of the normal inspection data upload process, to simultaneously transmit the inspection data to a network address. In such an embodiment, the inspection monitor 15 may access the same network address to obtain the inspection data for that facility using a software interface executing on the inspection monitor's interface device 16.

Figure 4:
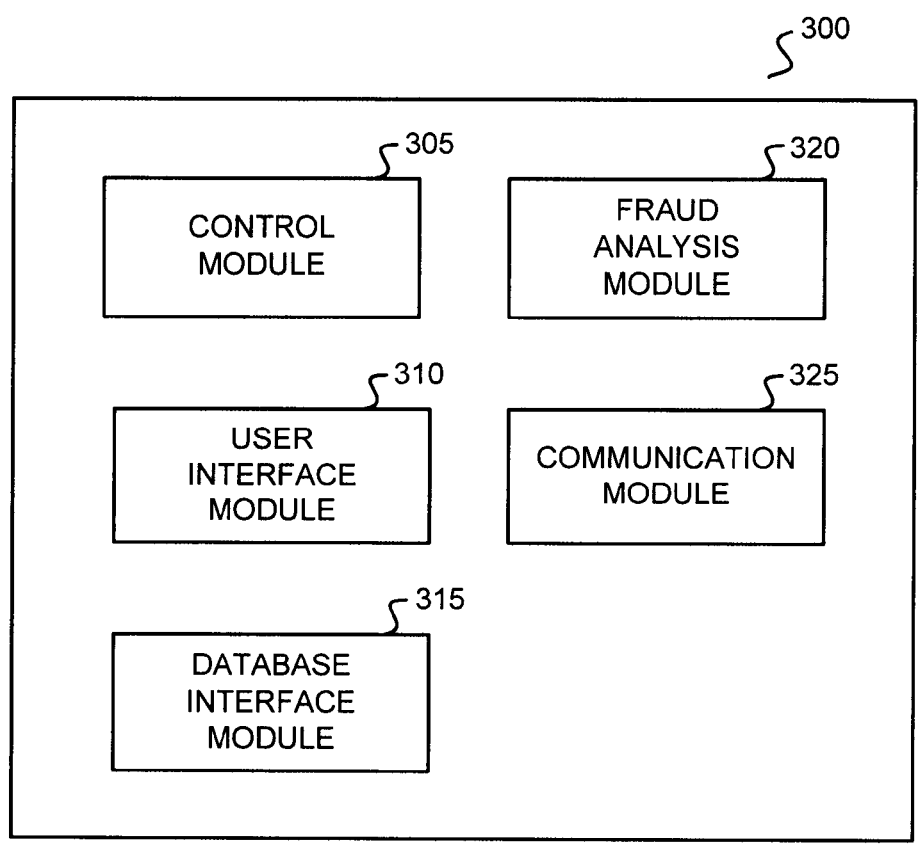
FIG. 4 is a block diagram illustrating components of an exemplary system for facilitating remote monitoring of vehicle inspections in accordance with various embodiments of the disclosure.

Referring now to FIG. 4, a block diagram illustrating components of an exemplary system for performing remote monitoring of vehicle inspections in accordance with various embodiments of the disclosure is depicted. The system 300 may be part of the inspection monitor's interface device 16 depicted in FIG. 1, and may comprise various modules that provide functionality enabling the inspection monitor 15 to interact with the centralized inspection database 14 to access vehicle inspection data and to perform queries of the vehicle inspection data stored therein. In the example of FIG. 4 there is a control module 305, a user interface module 310, a database interface module 315, a fraud analysis module 320 and a communication module 325. It should be appreciated that each module may be configured as a software application executing on computer hardware, an application specific integrated circuit (ASIC), a combination of hardware and software, or other suitable configuration. Moreover, one or modules may be combined or broken into multiple additional modules.

The communication module 325, such as, for example, a network interface card, wireless interface card, wireless broadband card, etc., and corresponding device drivers may enable two-way communication between the inspection monitor's interface device 16 and the network 130 from which the centralized inspection database 130 is accessible. In various embodiments, the user interface module 310 may serve as the primary interface between the interface device 16 and the inspection monitor 15. The inspection monitor 15 may use the user interface module 310 of the interface device 16 to enter data including identification credentials and query fields and to view information retrieved from the centralized inspection database 130.

In various embodiments, the database interface module 315 may comprise an application program interface (API) for interacting with the native language of the centralized inspection database 130. Thus, in such embodiments, operation of the database interface module 315 may be transparent to the inspection monitor 15. In various embodiments, the fraud analysis module 320 may comprise one or more preprogrammed routines configured to analyze data retrieved from the centralized inspection database 130 for the possible presence of fraud. As noted above, this may comprise searching for differences between data for a single vehicle inspection facility and/or vehicle inspector and aggregate data that exceeds a predetermined threshold for one or more inspection fields.

In various embodiments, if fraud is suspected by the fraud analysis module 320, an indication may be provided to the inspection monitor 15 via the user interface module 310. Also, as noted above, in embodiments, where the inspection monitor 15 accesses a vehicle inspection facility's inspection data from other than the centralized inspection database 14, such as, for example, by accessing the vehicle inspection facility's inspection computer system 12 directly, by intercepting transmissions, or by accessing the data from another network site, the database interface module 315 may include necessary application program interfaces (APIs) and/or other software required to interface to such systems.

Each module listed in the system 300 of FIG. 4 may operate autonomously or under the control of the control module 305. For example, in various embodiments, the control module 305 may be a CPU of the inspection monitor's interface device 16. The control module 305 may also be a real time kernel of a control program of the inspection monitor's interface device 15. Furthermore, it should be appreciated that the particular modules illustrated in FIG. 4 are exemplary only and should not be construed as either necessary or exhaustive. In various embodiments, it may be desirable to use more, less or even different modules than those illustrated in FIG. 4. In various embodiments, access to the centralized inspection database 130 may occur in real or near real time so that an inspection monitor 15 may obtain vehicle inspection information corresponding to vehicle inspections that are in progress or recently completed.

Figure 5:
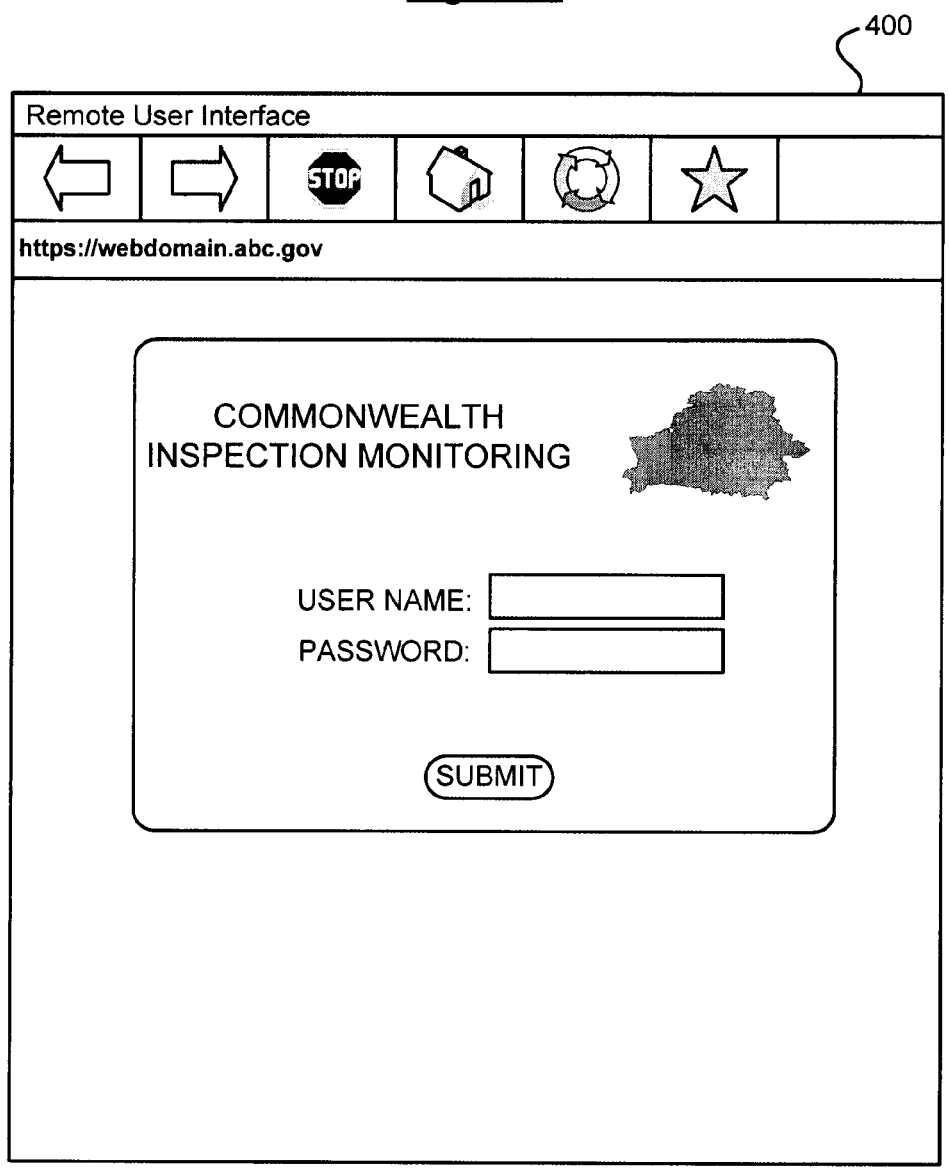
FIG. 5 is an exemplary screen of a remote monitoring interface including a login screen in accordance with various embodiments of the disclosure.

FIG. 5 is an exemplary screen of a remote monitoring interface including a login screen in accordance with various embodiments of the disclosure. The exemplary interface screen 400 depicted in FIG. 5 is shown as a browser-type interface screen. Although, it should be appreciated that in other embodiments the interface screen 400 may have a different "look and feel." The inspection monitor 15 may, in various embodiments, access the log in screen 400 via his/her wireless computing device 16 that is configured to communicate over a wireless network with the remote vehicle inspection database.

FIG. 6 is another exemplary screen of a remote monitoring interface including a home screen in accordance with various embodiments of the disclosure. The screen 500 of FIG. 6 may be accessed after logging in to the centralized inspection database 30. The interface screen 500 may in various embodiments comprise a home screen, that is, one initially displayed after logging in. In the example of FIG. 5, the screen 500 includes information corresponding to the inspection monitor's jurisdiction, including the overall pass/fail rate and average inspection time across the jurisdiction. The screen 500 may also include a "start monitor" function. In various embodiments, the start monitor function may allow the inspection monitor 15 to input a station ID number of a vehicle inspection facility to monitor. In various embodiments the screen 500 may also include a vehicle inspection facility lookup function to permit an inspection monitor 15 to find a particular station using an address, name, city, etc., using well known techniques.

FIG. 7 is yet another exemplary screen of remote monitoring interface including an vehicle inspection facility detail in accordance with various embodiments of the disclosure. The exemplary interface window 600 includes an example of a station (vehicle inspection facility) detail page that may be displayed after an inspection monitor has requested to monitor a particular vehicle inspection station. For ease of illustration, the interface control buttons shown in FIGS. 5 and 6 have been omitted.

The exemplary station detail page 600 may include information such as the statistics for the jurisdiction in combination with overall statistics for the particular station including historical statistics for that station as well as statistics on real-time, that is in-progress, inspections. Though the station detail page 600 is shown in this example as a single page, the inspection monitor 15 may have to scroll down to view the complete detail record or click on links to subsequent record pages using well known techniques.

In various embodiments of the disclosure, from a cursory analysis of this data, the inspection monitor 15 may be able to make a quick judgment of whether or not to suspect fraudulent inspection practices at the current vehicle inspection facility, for example, by comparing the pass rate and/or average vehicle inspection time for vehicle inspectors at the current vehicle inspection station versus the overall statistics for the jurisdiction. In various embodiments, any of the in-progress or recently completed vehicle inspections may be selected via the inspection monitor's interface device 16 to display a full detail for that particular vehicle inspection, such as, for example, the vehicle inspection detail screen of FIG. 8.

FIG. 8 is a further exemplary screen of a remote monitoring interface including a single vehicle inspection record detail in accordance with various embodiments of the disclosure. The exemplary screen 700 of FIG. 8 includes detail information on a single vehicle inspection record. In various embodiments, this may include details about the particular vehicle inspected including identification information corresponding to the vehicle, the inspection results including emissions data and information identifying the inspector who performed the inspection.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than a restrictive sense.

The invention claimed is:

1. A system comprising:
 a centralized inspection database, accessible via a communication network and storing vehicle inspection data therein;
 a plurality of vehicle inspection facilities, each vehicle inspection facility comprising at least one vehicle inspection computer system that communicates vehicle inspection information to the centralized inspection database via the communication network; and
 at least one user interface device configured to remotely access vehicle inspection data of a particular vehicle inspection facility during transmission of the vehicle inspection data to the centralized inspection database from the vehicle inspection computer system of the particular vehicle inspection facility and analyze the vehicle inspection data corresponding to the particular vehicle inspection facility as the vehicle inspection data is being remotely accessed, wherein the at least one user interface device is further configured to automatically alert the user during the transmission of the vehicle inspection data when the analysis of the vehicle inspection data indicates fraudulent inspection practices, wherein the alert highlights the vehicle inspection data associated with the fraudulent inspection practices for inspections currently in progress on an output screen of the at least one user interface device.

2. The system according to claim 1, wherein the at least one user interface device comprises computer readable instructions stored in a computer readable storage medium adapted to cause the at least one user interface device to transmit a request for the vehicle inspection data corresponding to the particular vehicle inspection facility and to output the vehicle inspection data received in response to the request on a native display of the at least one user interface device.

3. The system according to claim 2, wherein the vehicle inspection data comprises historical data associated with the particular vehicle inspection facility.

4. The system according to claim 2, wherein the vehicle inspection data comprises data associated with inspections currently in progress.

5. The system according to claim 2, wherein the vehicle inspection data comprises aggregate benchmark information from other vehicle inspection facilities.

6. The system according to claim 1, wherein the at least one user interface device further comprises a data analysis module.

7. The system according to claim 6, wherein the data analysis module comprises a set of computer readable instructions stored in a computer readable storage medium adapted to cause a computing device to aggregate benchmark information and to alert a user when the analysis of the vehicle inspection data corresponding to the particular vehicle inspection facility and the aggregate benchmark information suggests fraudulent inspection practices.

8. The system according to claim 7, wherein fraudulent inspection practices are suggested by deviations from the aggregate benchmark information in one or more inspection information fields exceeding a predetermined threshold.

9. The system according to claim 8, wherein the one or more inspection information fields comprise one or more fields chosen from the group consisting of average inspection time across a vehicle inspection facility, average inspection pass rate across a vehicle inspection facility, vehicle inspection time, and vehicle inspection pass rate.

10. A method comprising:
 connecting a communication device to a remote vehicle inspection database;
 retrieving vehicle inspection information during transmission of the vehicle inspection information to the remote vehicle inspection database;
 outputting the vehicle inspection information to the communication device;
 analyzing the vehicle inspection information in accordance with one or more data analysis programs as the vehicle inspection information is being retrieved, wherein analyzing the vehicle inspection information in accordance with one or more data analysis programs comprises analyzing the vehicle inspection information for the presence of fraudulent inspection practices by checking at least one inspection field for deviation beyond a predetermined threshold; and
 providing an automatic alert with the communication device while the vehicle inspection data is being retrieved when the analysis of the vehicle inspection information indicates fraudulent inspection practices, wherein the alert highlights the vehicle inspection data associated with the fraudulent inspection practices for inspections currently in progress on an output screen of the communication device.

11. The method according to claim 10, wherein retrieving vehicle inspection information comprises receiving an input from the communication device identifying a particular inspection facility and retrieving vehicle inspection information from the remote vehicle inspection database associated with that particular inspection facility.

12. The method according to claim 10, wherein retrieving vehicle inspection information comprises retrieving aggregate vehicle inspection information corresponding to one or more vehicle inspection facilities.

13. The method according to claim 10, wherein checking at least one inspection field comprises checking at least one field selected from the group consisting of average inspection time across a vehicle inspection facility, average vehicle inspection pass rate across a vehicle inspection facility, average vehicle inspection time, and average vehicle inspection pass rate.

14. A method comprising:
  accessing vehicle inspection information with a portable computing device during transmission of the vehicle inspection information to a database, the database comprising vehicle inspection information received from a plurality of vehicle inspection facilities;
  analyzing the vehicle inspection information with a fraud analysis module executing on the portable computing device as the vehicle inspection information is being accessed, wherein analyzing vehicle inspection information from the database with a fraud analysis module comprises determining whether fraudulent inspection practices are suspected at a particular vehicle inspection facility by analyzing the vehicle inspection information to determine whether at least one inspection field of the vehicle inspection information deviates from an aggregate value for the at least one inspection field by more than a predetermined threshold; and
  providing an automatic alert via the portable computing device while the vehicle inspection data is being accessed when fraudulent inspection practices are suspected at the particular vehicle inspection facility, wherein the alert highlights the vehicle inspection data associated with the fraudulent inspection practices for inspections currently in progress on an output screen of the portable computing device.

15. The method according to claim 14, wherein accessing a database of vehicle inspection information comprises retrieving vehicle inspection information associated with a particular vehicle inspection facility stipulated by a user via an interface of the portable computing device.

16. The method according to claim 14, wherein the at least one inspection field comprises at least one inspection field selected from the group consisting of average inspection time across a vehicle inspection facility, average vehicle inspection pass rate across a vehicle inspection facility, average vehicle inspection time, and average vehicle inspection pass rate.

* * * * *